Aug. 13, 1957    E. SCHWEPPE    2,802,574
CENTRIFUGAL MACHINE FOR EXTRACTING SOLIDS FROM LIQUIDS
Filed Sept. 30, 1953

INVENTOR.
ERNST SCHWEPPE
BY

United States Patent Office 2,802,574
Patented Aug. 13, 1957

2,802,574
CENTRIFUGAL MACHINE FOR EXTRACTING SOLIDS FROM LIQUIDS

Ernst Schweppe, Dortmund, Germany, assignor to Hein, Lehmann & Co. Aktiengesellschaft, Dusseldorf, Germany Application September 30, 1953, Serial No. 383,245

Claims priority, application Germany October 2, 1952

1 Claim. (Cl. 210—369)

This invention relates to a centrifugal machine for extracting solids from liquids and, more particularly, to a revolving screen to be employed in such centrifugal machines.

With heretofore known machines of the type referred to above, a truncated cone-shaped screen is rotated and the substance to be processed is introduced into the machine at the bottom of the revolving screen. Because of the centrifugal forces arising during the revolution of the screen, the substance is thrown against the revolving screen on the interior surface of which the solids deposit and while forming a layer move slowly upwardly until they pass down over the rim of the drum, while the liquid escapes through the screen toward the outside.

The invention has for its object to improve the efficiency of such a revolving screen and to render the separation of the dry substance from the liquid more effective to thereby increase the output of the machine.

According to the invention this object has been materialized by shaping the fundamentally conic wall of the revolving screen cascade-like. This shape will bring about the following result during operation: the speed at which the deposited substance moves upwardly on the interior surface of the revolving drum is interrupted stepwise in conformity with the number and the shape of the cascades, and simultaneously the circumferential speed increases stepwise according to the tapered enlargement of the drum. As a result of this action, the substance layer being deposited on the interior surface of the drum is interrupted several times during its upward motion and thereby is split up to form particles of smallest size, whereby the separation of solids from the liquid is influenced favorably.

Figure 1:
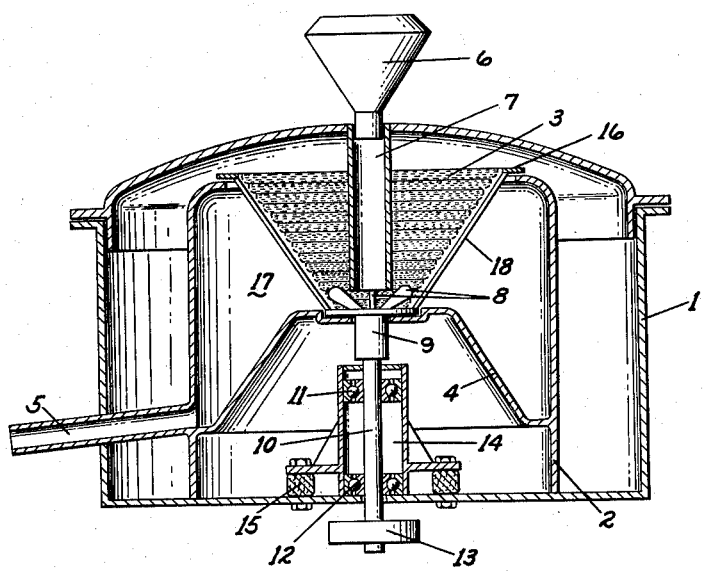
Figure 2:
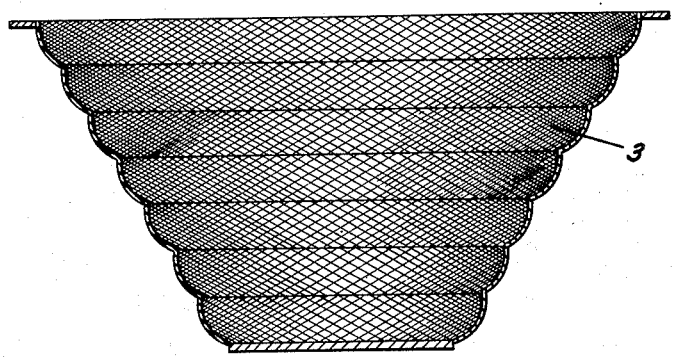

The invention will appear more clearly from the following specification in connection with the accompanying drawing, in which:

Fig. 1 diagrammatically and in section illustrates a centrifugal machine with a revolving screen according to the invention;

Fig. 2 represents a cross section of the revolving screen on a scale larger than that of Fig. 1.

The fundamental construction of the machine is known in itself. The numeral 1 designates the cylindrical exterior housing which is covered at its top, while a further cylindrical body 2 is arranged in the housing 1 in spaced relationship thereto and is open at its top. A revolving screen 3 rotates within the body 2. The interior space of the cylindrical body 2 is subdivided by means of the tapered wall 4, so that the liquid accumulating in the space formed by said cylindrical body 2 is allowed to flow off through the outlet tube 5. The substance to be processed is fed through the charging hopper 6 and the feed tube 7 to the bottom of the revolving screen 3. A mixer or distributor 8 is rotatably arranged at the bottom of the revolving screen for throwing the substance charged into the drum to the interior surface of same. The drum itself is connected with the driving shaft 10 through an intermediate member 9. The shaft 10 is journalled in bearings 11 and 12 and has its lower end provided with a pulley or any other suitable member 13 through which the revolving screen is driven by means of a prime mover. The bearings 11 and 12 are located in a housing 14 fastened to the foundation while an elastic body 15 is interposed therebetween.

Referring now to Figure 2, it will be seen that the revolving screen 3 conically widens by steps from the bottom toward the top in cascade-like manner. With the embodiment as represented in the drawing the different cascades have a curved shape, i. e. they have a continuously altering curve contour. However, instead of a curved contour, the cascades may also have an acute angled contour. The principle requirement merely consists in that the fundamentally plain surface of the wall of the drum is interrupted stepwise by cascades.

The revolving screen is supported by means of a rotating frame 18 having openings which allow the liquid to pass therethrough.

According to the construction described above, the substance charged through the charging hopper 6 and the feed tube 7 will be separated, due to the rotation of the drum, in such a manner that the solids being deposited on the internal surface of the wall of the drum move slowly upwardly and finally drop over the edge 16 of the drum into the annular space which is formed between the internal cylinder 2 and the housing 1, while the liquid escapes through the perforations of the revolving screen into the chamber 17 and flows off from this chamber through the discharge pipe 5. The dry substance is consequently not any longer removed from the drum by means of a worm conveyer as is commonly used with other known machines of this type. Due to its simple construction the machine according to the invention is more rugged and thus better resistant against rough handling. It has been found that the fuel consumption is low when compared with other known machines of this kind.

What is claimed is:

A rotatable screen body for use in connection with a centrifuge for extracting solids from liquids, characterized in that said screen body comprises a solid bottom for receiving the solids containing liquid to be centrifuged, and further characterized in that the said screen body is perforated in a continuous manner throughout and over its entire side wall which latter is made up of a plurality of parallel successive ring sections each of which has an outwardly curved annular inner wall surface, the maximum diameters of the inner wall surfaces of said ring sections respectively increasing with each successive ring section from the bottom end to the top end of said screen body to thereby form a truncated cone-shaped screen body with an undulated inner wall surface, the curvature of the annular inner wall surface of each ring section comprising a relatively steep portion extending substantially from the maximum inner diameter of the respective ring section to the top end thereof and also comprising a considerably flatter portion extending substantially from the maximum inner diameter of the respective ring section to the bottom end thereof so that the top portion of each ring section forms a relatively sharp step with the adjacent bottom portion of the in upward direction next succeding ring section.

References Cited in the file of this patent

UNITED STATES PATENTS

| 1,569,778 | Murphy | Jan. 12, 1926 |
| 1,839,941 | Zelezniak | Jan. 5, 1932 |
| 2,100,117 | Wettloufer | Nov. 23, 1937 |
| 2,422,464 | Bartholomew | June 17, 1947 |

FOREIGN PATENTS

| 221,961 | Germany | Mar. 27, 1908 |
| 118,262 | Great Britain | Aug. 22, 1918 |
| 261,851 | Great Britain | Nov. 29, 1926 |
| 67,095 | Norway | Nov. 22, 1943 |